(12) United States Patent
Sugisaka et al.

(10) Patent No.: US 8,807,510 B2
(45) Date of Patent: Aug. 19, 2014

(54) MIRROR DEVICE FOR A VEHICLE

(75) Inventors: Kenichi Sugisaka, Aichi-ken (JP); Masami Kato, Aichi-ken (JP)

(73) Assignee: Kabushiki Kaisha Tokai-Rika-Denki-Seisakusho, Aichi-Ken (JP)

( * ) Notice: Subject to any disclaimer, the term of this patent is extended or adjusted under 35 U.S.C. 154(b) by 295 days.

(21) Appl. No.: 13/282,965

(22) Filed: Oct. 27, 2011

(65) Prior Publication Data
US 2012/0119053 A1    May 17, 2012

(30) Foreign Application Priority Data
Nov. 11, 2010  (JP) ................................. 2010-252828

(51) Int. Cl.
   *A47F 7/14*     (2006.01)
   *A47G 1/06*     (2006.01)
(52) U.S. Cl.
   USPC ........ 248/475.1; 248/476; 248/479; 359/841; 359/872
(58) Field of Classification Search
   USPC ....................... 248/475.1, 476, 479, 485, 487
   See application file for complete search history.

(56) References Cited

U.S. PATENT DOCUMENTS

| 3,390,588 | A | * | 7/1968 | Savage | 74/502.1 |
| 4,905,954 | A | * | 3/1990 | Taylor | 248/475.1 |
| 5,576,899 | A | * | 11/1996 | Englander | 359/871 |
| 6,220,716 | B1 | * | 4/2001 | Asaka | 359/871 |

FOREIGN PATENT DOCUMENTS

| JP | 6-33739 U | 5/1994 |
| JP | 2003-267132 A | 9/2003 |
| JP | 2008-254552 | 10/2008 |

* cited by examiner

*Primary Examiner* — Amy J Sterling
(74) *Attorney, Agent, or Firm* — Roberts Mlotkowski Safran & Cole P.C.

(57) ABSTRACT

Accuracy of positioning of a turning body to a mounting member when the mounting member and a support member are separate components is improved. In a vehicle door mirror device, a stand of a housing device is mounted to a base by being fastened with mounting screws. Axial directions of the mounting screws are angled with respect to an axial direction of the stand. An inner periphery abutting face and a vertical abutting face of the stand are abutted against an outer periphery abutting face and a perpendicular abutting face of the base in directions perpendicular to the axis of the stand. Thus, the stand is positioned to the base in whole directions perpendicular to the axis of the stand. Therefore, positioning accuracy of the housing device and a main body portion to the base in whole directions perpendicular to the axis of the stand can be improved.

10 Claims, 10 Drawing Sheets

MIRROR DEVICE FOR A VEHICLE

CROSS-REFERENCE TO RELATED APPLICATION

This application claims priority under 35 USC 119 from Japanese Patent Application No. 2010-252828 filed Nov. 11, 2010, the disclosure of which is incorporated by reference herein.

BACKGROUND OF THE INVENTION

1. Field of the Invention

The present invention relates to a mirror device for a vehicle at which a mirror is made turnable about an axis of a support member.

2. Related Art

In a mirror device for a vehicle recited in Japanese Utility Model Application Laid-Open (JP-U) No. 6-33739), a base is mounted to a door panel of a vehicle body, and a turnable housing is supported to be turnable about a turning shaft of the base. A base cover is mounted to the base. Thus, the base cover is positioned at the base, and accuracy of positioning of the turnable housing with respect to the base cover is improved.

In this mirror device for a vehicle, the turning shaft is a separate component from the base.

In this case, when the turning shaft is mounted to the base, accuracy of positioning of the turnable housing with respect to the base and the base cover may be improved if the turning shaft is positioned with respect to the base.

SUMMARY OF THE INVENTION

In consideration of the situation described above, the present invention is to provide a mirror device for a vehicle that, in a case where a mounting member and a support member are separate components, can improve accuracy of positioning of a turning body with respect to the mounting member.

A mirror device for a vehicle according to a first aspect of the present invention includes: a mounting member that is provided at a vehicle body side; a support member that supports a turning body at which a mirror is provided, the turning body being turned about an axis of the support member such that the mirror is turnable; a fastening member that fastens the mounting member and the support member, and mounts the support member to the mounting member, an axial direction of the fastening member being inclined to an axial direction of the support member; a first abutting surface that is provided at the mounting member; and a second abutting surface that is provided at the support member and that, by abutting against the first abutting surface, positions the support member with respect to the mounting member in a direction perpendicular to the axial direction of the support member.

A mirror device for a vehicle according to a second aspect is the mirror device for a vehicle according to the first aspect, further including: a cover member that is mounted to the mounting member and covers the mounting member; a sealing member that is mounted to the mounting member and seals a portion between the vehicle body side and the mounting member; and a temporary fixing member that is mounted to the mounting member and temporarily fixes the mounting member at the vehicle body side, wherein at least one of a direction of mounting of the mounting member to the vehicle body side, a direction of mounting of the cover member to the mounting member, a direction of mounting of the sealing member to the mounting member or a direction of mounting of the temporary fixing member to the mounting member, is parallel with a direction of mounting of the support member to the mounting member.

A mirror device for a vehicle according to a third aspect is the mirror device for a vehicle according to the first aspect or the second aspect, further including: a cover member that is mounted to the mounting member and covers the mounting member; and a third abutting surface that is provided at the cover member and that, by abutting against the first abutting surface, positions the cover member with respect to the mounting member in a direction perpendicular to the axial direction of the support member.

A mirror device for a vehicle according to a fourth aspect includes: a mounting member that is provided at a vehicle body side; a support member that is mounted to the mounting member and supports a turning body at which a mirror is provided, the turning body being turned about an axis of the support member such that the mirror is turnable; a cover member that is mounted to the mounting member and covers the mounting member; a fourth abutting surface that is provided at the support member; a fifth abutting surface provided at the cover member; and a sixth abutting surface that is provided at the mounting member and that, by abutting against the fourth abutting surface and the fifth abutting surface, respectively positions the support member and the cover member with respect to the mounting member in an axial direction of the support member.

A mirror device for a vehicle according to a fifth aspect includes: a mounting member that is provided at a vehicle body side; a support member that supports a turning body at which a mirror is provided, the turning body being turned about an axis of the support member such that the mirror is turnable; a first abutting surface that is provided at the mounting member; a second abutting surface that is provided at the support member and that, by abutting against the first abutting surface, positions the support member with respect to the mounting member in a direction perpendicular to an axial direction of the support member; a cover member that is mounted to the mounting member and covers the mounting member; a fourth abutting surface that is provided at the support member; a fifth abutting surface provided at the cover member; and a sixth abutting surface that is provided at the mounting member and that, by abutting against the fourth abutting surface and the fifth abutting surface, respectively positions the support member and the cover member with respect to the mounting member in the axial direction of the support member.

It is possible in the aspects that the first abutting surface includes a curved surface and a planar surface; the second abutting surface includes a curved surface and a planar surface; and the curved surface of the first abutting surface abuts against the curved surface of the second abutting surface, and the planar surface of the first abutting surface abuts against the planar surface of the second abutting surface such that the first abutting surface and the second abutting surface are abutted in plural different directions perpendicular to the axial direction of the support member.

It is possible in the aspects that an upper face of a first member provided at the mounting member and an upper face of a second member provided at the mounting member are disposed in the same plane to form the sixth abutting surface.

In the mirror device for a vehicle according to the first aspect, the support member supports the turning body at which the mirror is provided, the turning body is turnable about the axis of the support member, and the mirror is made to be turnable.

The fastening member fastens together the mounting member provided at the vehicle body side and the support member, and the support member is mounted to the mounting member. The axial direction of the fastening member is inclined (crossed or angled) to the axial direction of the support member.

Due to that the second abutting surface provided at the support member abuts against the first abutting surface provided at the mounting member, the support member is positioned with respect to the mounting member in a direction perpendicular to the axis direction.

Therefore, even though the axial direction of the fastening member is inclined to the axial direction of the support member, accuracy of positioning of the turning body with respect to the mounting member can be improved.

In the mirror device for a vehicle according to the second aspect, the cover member is mounted to the mounting member, and the cover member covers the mounting member. In addition, the sealing member is mounted to the mounting member, and the sealing member seals a portion between the vehicle body side and the mounting member. The temporary fixing member is also mounted to the mounting member, and the temporary fixing member temporarily fixes (mounts) the mounting member at the vehicle body side.

At least one of the mounting direction of the mounting member to the vehicle body side, the mounting direction of the cover member to the mounting member, the mounting direction of the sealing member to the mounting member and the mounting direction of the temporary fixing member to the mounting member is made to be parallel to the mounting direction of the support member to the mounting member.

Therefore, the mirror device for a vehicle can be easily assembled.

In the mirror device for a vehicle according to the third aspect, the cover member is mounted to the mounting member, and the cover member covers the mounting member.

Due to that the third abutting surface provided at the cover member abuts against the first abutting surface provided at the mounting member, the cover member is positioned with respect to the mounting member in a direction perpendicular to the axis direction of the support member.

Therefore, accuracy of positioning of the support member and the cover member with respect to the mounting member can be improved, and accuracy of positioning of the turning body with respect to the cover member can be improved.

In the mirror device for a vehicle according to the fourth aspect, the support member is mounted to the mounting member provided at the vehicle body side, and the support member supports the turning body at which the mirror is provided. The turning body is turnable about the axis of the support member, and the mirror is made to be turnable. The cover member is also mounted to the mounting member, and the cover member covers the mounting member.

Due to that the fourth abutting surface provided at the support member and the fifth abutting surface provided at the cover member abut against the sixth abutting surface provided at the mounting member, the support member and the cover member are both positioned with respect to the mounting member in the axial direction of the support member.

Therefore, accuracy of positioning of the support member and the cover member with respect to the mounting member can be improved, and accuracy of positioning of the turning body with respect to the support member and the cover member can be improved.

In the mirror device for a vehicle according to the fifth aspect, similarly as the first and fourth aspects, accuracy of positioning of the support member and the cover member with respect to the mounting member can be improved, and accuracy of positioning of the turning body with respect to the support member and the cover member can be improved.

BRIEF DESCRIPTION OF THE DRAWINGS

Embodiments of the invention will be described in detail with reference to the following figures, wherein.

DETAILED DESCRIPTION OF THE INVENTION

Figure 1:
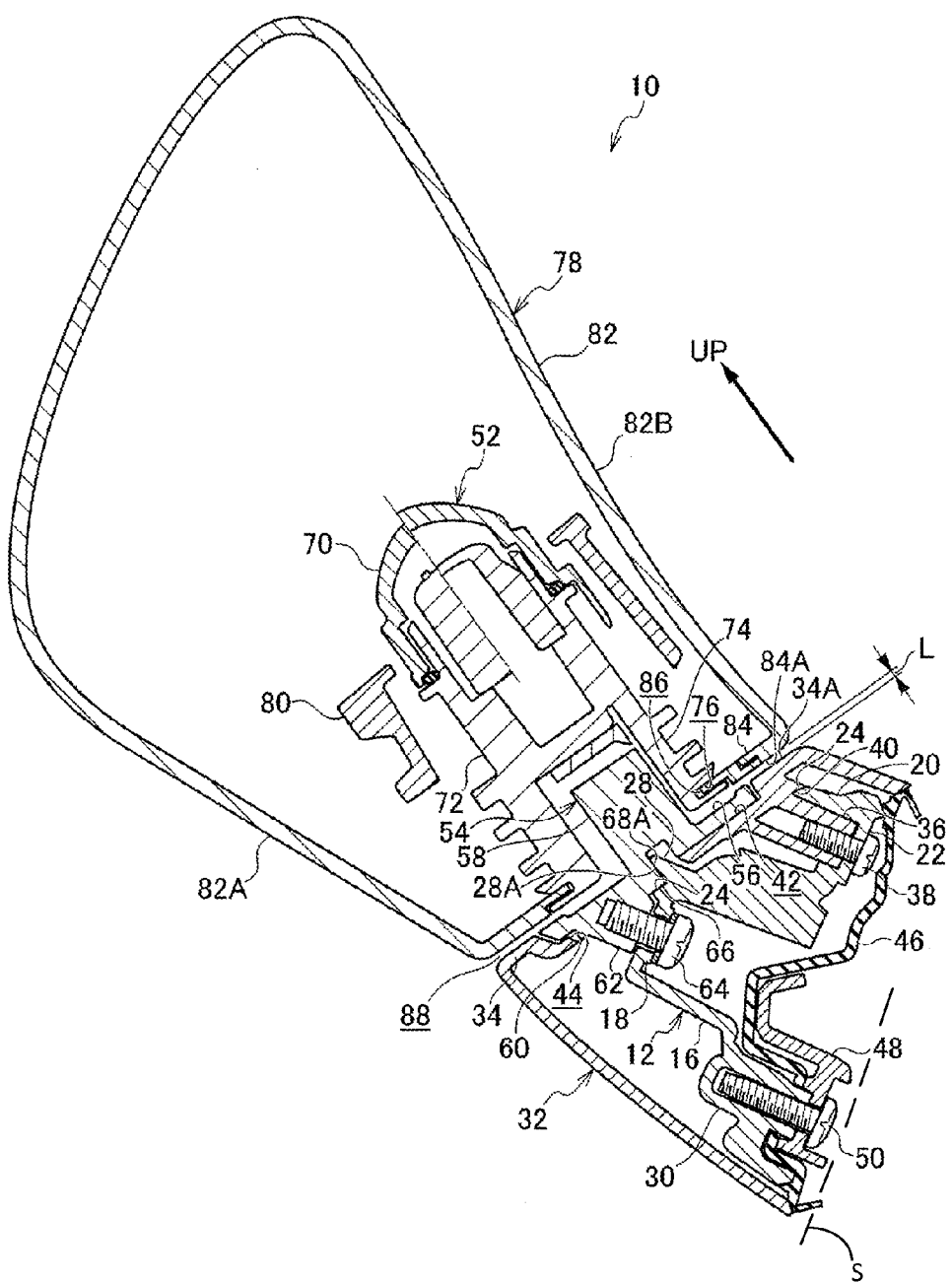
FIG. 1 is a sectional diagram, viewed from sideward, illustrating a door mirror device for a vehicle relating to an exemplary embodiment of the present invention.
Figure 2:
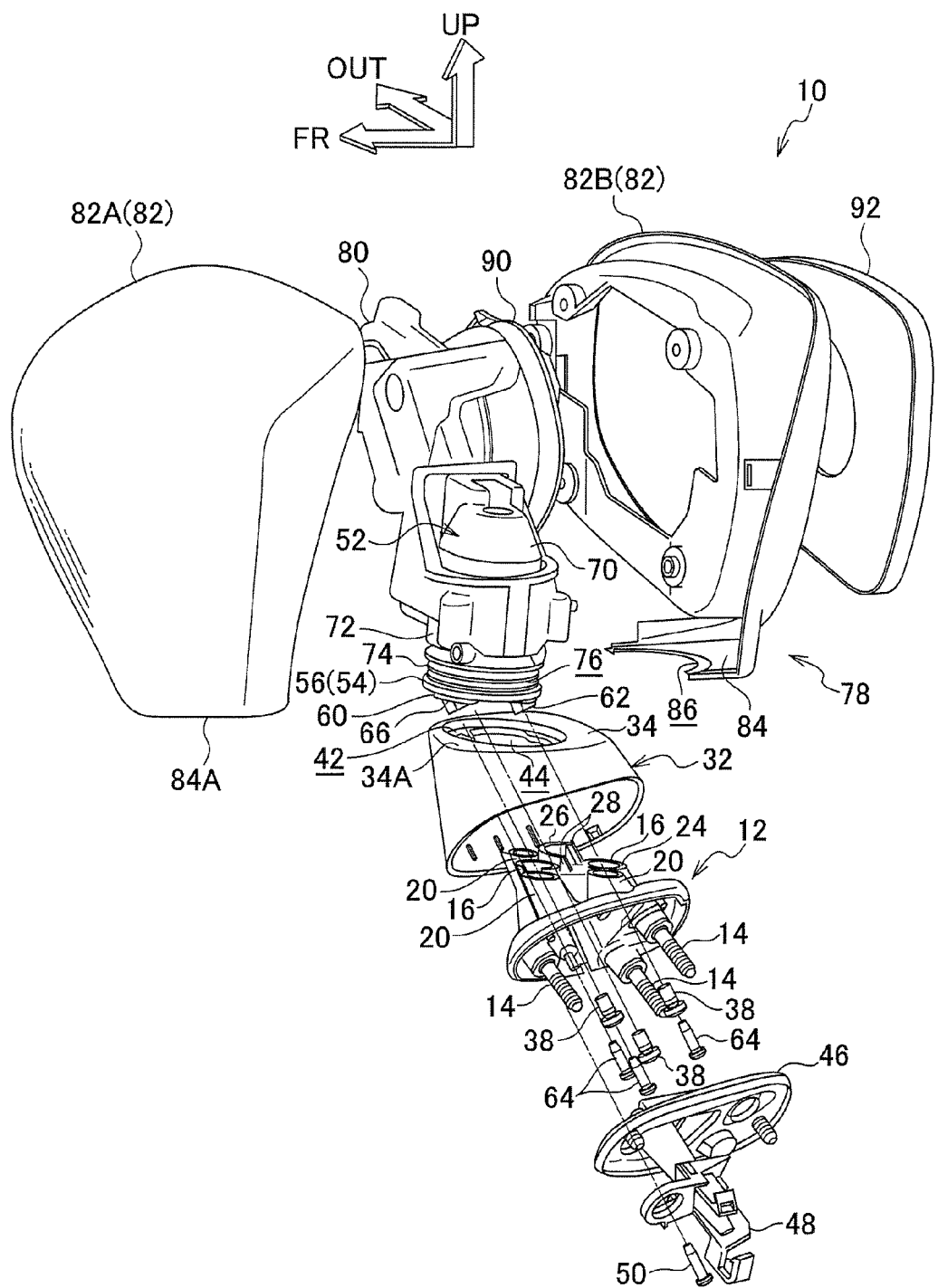
FIG. 2 is an exploded perspective diagram, viewed from a vehicle width direction inner side, illustrating the door mirror device for a vehicle relating to the exemplary embodiment of the present invention.

FIG. 1 illustrates a vehicle door mirror device 10, relating to an exemplary embodiment in which the mirror device for a vehicle body side S of the present invention is deployed, in a sectional diagram viewed from sideward. FIG. 2 illustrates the vehicle door mirror device 10 in an exploded perspective diagram viewed from the vehicle width direction inner side. In the drawings, forward of the vehicle is indicated by the arrow FR, outward to sideward of the vehicle (rightward of the vehicle) is indicated by the arrow OUT, and upward is indicated by the arrow UP.

The vehicle door mirror device 10 relating to the present exemplary embodiment is provided at an outer portion of an up and down direction middle portion of a vehicle front side end portion of a door of the vehicle (not shown in the drawings).

As illustrated in FIG. 1 and FIG. 2, the vehicle door mirror device 10 is provided with a block-form base 12 made of metal, which serves as a mounting member, at a vehicle width direction inner side end portion thereof. A lower side face of the base 12 is oriented in a direction facing to the lower side toward the vehicle width direction inner side.

A plural number (three in the present exemplary embodiment) of stud bolts 14, which serve as a mounting part, are fixed (fastened) to the lower side face of the base 12. Axial directions of the plural stud bolts 14 are disposed to be parallel with one another, and are angled in a direction facing to the lower side toward the vehicle width direction inner side. The base 12 is mounted to the door of the vehicle by fastening with the plural stud bolts 14. Thus, the vehicle door mirror device 10 is mounted to the door of the vehicle.

Figure 6:
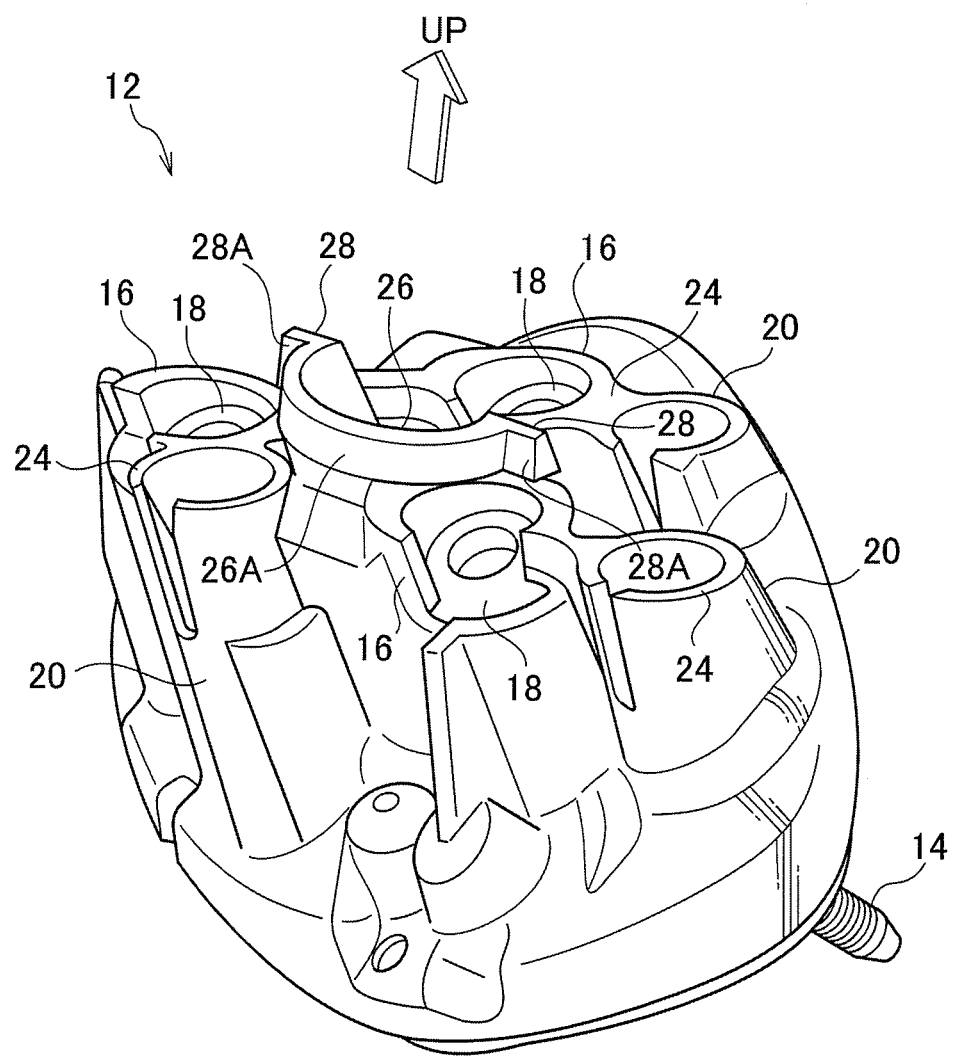
FIG. 6 is a perspective diagram, viewed from the vehicle width direction inner side, illustrating the base of the door mirror device for a vehicle relating to the exemplary embodiment of the present invention.
Figure 7:
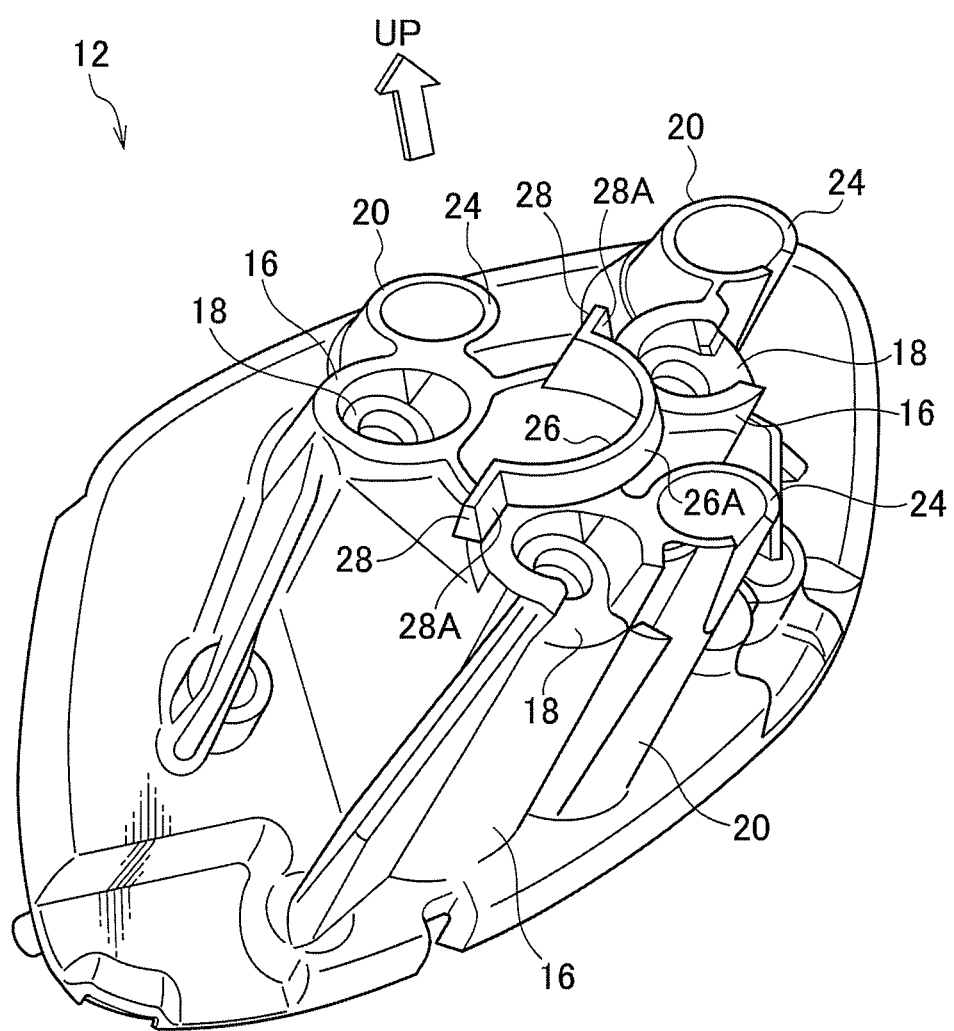
FIG. 7 is a perspective diagram, viewed from the vehicle width direction outer side, illustrating the base of the door mirror device for a vehicle relating to the exemplary embodiment of the present invention.

As is illustrated in detail in FIG. 6 and FIG. 7, a plural number (three in the present exemplary embodiment) of circular tube-form mounting tubes 16 are formed at the base 12. Axial directions of the plural mounting tubes 16 are disposed to be parallel with one another, and are angled in a direction facing to the lower side toward the vehicle width direction inner side. An annular plate-form mounting ring plate 18 is integrally formed inside each mounting tube 16. The mounting ring plate 18 is disposed at an upper end vicinity of the mounting tube 16 to be orthogonal to the axial direction of the mounting tube 16.

A plural number (three in the present exemplary embodiment) of circular tube-form assembly tubes 20 are formed at the base 12. Axial directions of the plural assembly tubes 20 are disposed to be parallel with one another, and are disposed to be parallel with the axial directions of the mounting tubes 16. An annular plate-form assembly ring plate 22 (see FIG. 1) is integrally formed in each assembly tube 20. The assembly ring plate 22 is disposed at a lower end of the assembly tube 20 to be orthogonal to the axial direction of the assembly tube 20.

Upper end faces of the mounting tubes 16 and upper end faces of the assembly tubes 20 are disposed in the same plane, and are formed to be flat plane-form lower abutting faces 24 that serve as a sixth abutting surface. The lower abutting faces 24 are disposed orthogonally to the up and down direction.

A semicircular tube-form abutting tube 26 is integrally formed on the lower abutting faces 24. An axial direction of the abutting tube 26 is disposed to be parallel with the up and down direction. An outer periphery face of the abutting tube 26 is formed to be a circumferential surface-form outer periphery abutting face 26A, which constitutes a first abutting surface and is disposed to be parallel with the up and down direction.

A pair of trapezoid solid-form abutting protrusions 28 are integrally formed on the lower abutting faces 24 to be continuous with each of two circumferential direction ends of the abutting tube 26. A surface of each abutting protrusion 28 that is continuous with the outer periphery abutting face 26A is formed to be a flat plane-form perpendicular abutting face 28A, which constitutes the first abutting surface. The perpendicular abutting faces 28A are disposed in the same plane (orthogonal to the circumferential direction of the outer periphery abutting face 26A), parallel with the up and down direction.

A circular tube-form temporary fixing (mounting) tube 30 (see FIG. 1) is formed at the base 12. An axial direction of the temporary fixing tube 30 is disposed to be parallel with the axial directions of the mounting tubes 16 and the assembly tubes 20.

Figure 5:
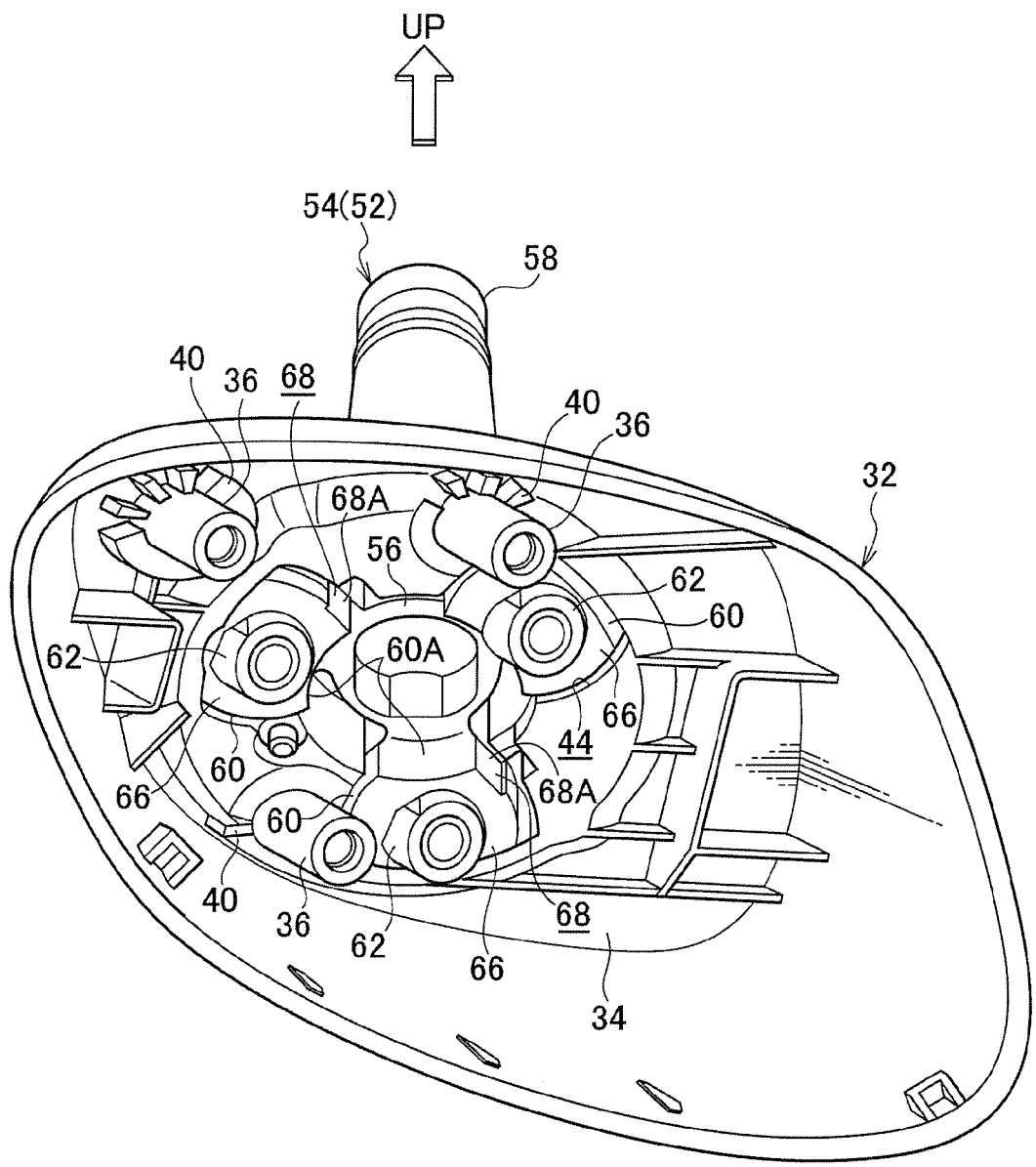
FIG. 5 is a perspective diagram, viewed from below, illustrating the base cover and stand of the door mirror device for a vehicle relating to the exemplary embodiment of the present invention.

As illustrated in FIG. 1, FIG. 2 and FIG. 5, the outer periphery of the base 12 is covered by a substantially circular tube-form base cover 32 made of resin, which serves as a cover member (and is a design member). The interior of the base cover 32 is opened in a direction facing to the lower side toward the vehicle width direction inner side. An axial direction length of a periphery wall of the base cover 32 is set to a longer length according to a distance from the vehicle width direction inner side to the vehicle width direction outer side.

A top wall 34 is provided at the upper end of the base cover 32. An upper end face of the top wall 34 is formed to be a flat plane-form lower parting face 34A, which is disposed to be orthogonal to the up and down direction.

A plural number (three in the present exemplary embodiment) of circular tube-form fastening tubes 36 are formed at a lower face of the top wall 34. Axial directions of the plural fastening tubes 36 are disposed to be parallel with one another, and are disposed to be parallel with the axial directions of the assembly tubes 20 of the base 12. The fastening tubes 36 are fitted into the assembly tubes 20 and are mounted to the assembly tubes 20 by fastening with assembly screws 38. The assembly screws 38 are inserted from the lower side into the assembly ring plates 22 of the assembly tubes 20 and threaded into the fastening tubes 36. Thus, the base cover 32 is mounted to the base 12. The fastening tubes 36 do not make contact with the assembly ring plates 22.

Flat plane-form inner abutting faces 40, which serve as a fifth abutting surface, are formed around the fastening tubes 36 at the lower face of the top wall 34. The plural inner abutting faces 40 are disposed in the same plane, orthogonal to the up and down direction. The respective inner abutting faces 40 abut against (make surface contact with) the lower abutting faces 24 of the assembly tubes 20 in the up and down direction. Thus, the base cover 32 is positioned in the up and down direction with respect to the base 12.

An insertion recess portion 42 is formed in the top wall 34. The insertion recess portion 42 opens upward.

An exposure hole 44 is formed in the top wall 34, penetrating through a floor wall portion of the insertion recess portion 42. The exposure hole 44 exposes the plural mounting tubes 16, the abutting tube 26 and the pair of abutting protrusions 28 of the base 12 to thereabove.

As illustrated in FIG. 1 and FIG. 2, a lower side face of the base cover 32 is covered by a plate-form gasket 46 that serves as a sealing member. The gasket 46 is made of rubber and features resilience and sealing ability. The whole of an outer periphery of the gasket 46 is retained in a state of being resiliently compressed and deformed between the base cover 32 and the door of the vehicle. Thus, a gap between the base cover 32 and the base 12 and the door of the vehicle is sealed. The temporary fixing tube 30 of the base 12 penetrates through the gasket 46.

A temporary fixing (mounting) pawl 48 (a temporary installation pawl, clamp grip) made of resin, which serves as a temporary fixing member (a temporary installation member), is mounted to the temporary fixing tube 30 of the base 12 by fastening with a fastening screw 50. The fastening screw 50 is inserted from the lower side and threaded into the temporary fixing tube 30. The temporary fixing pawl 48 anchors the gasket 46, and thus the gasket 46 is mounted to the base 12 together with the temporary fixing pawl 48. When the base 12 is to be mounted to the door of the vehicle by fastening with the plural stud bolts 14, the temporary fixing pawl 48 is hooked on (engaged with) the door of the vehicle. Thus, the vehicle door mirror device 10 is temporarily fixed (temporarily installed) at the door of the vehicle, and mispositioning and detachment of the vehicle door mirror device 10 from the door of the vehicle are inhibited.

A housing device 52 (a retractor) that serves as a housing unit is mounted to the upper side of the base 12.

Figure 8:
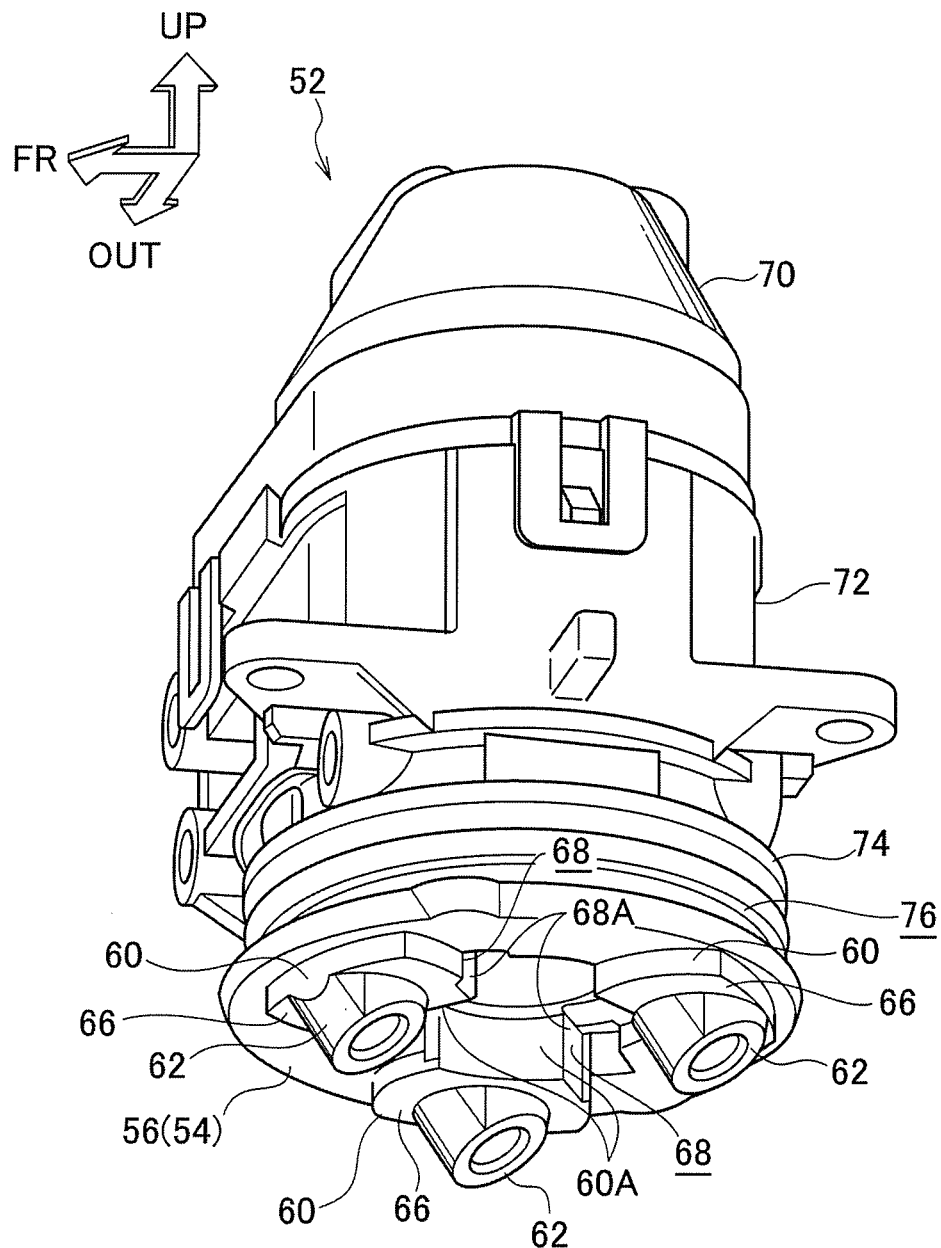
FIG. 8 is a perspective diagram, viewed from the vehicle width direction inner side, illustrating a housing device of the door mirror device for a vehicle relating to the exemplary embodiment of the present invention.
Figure 9:
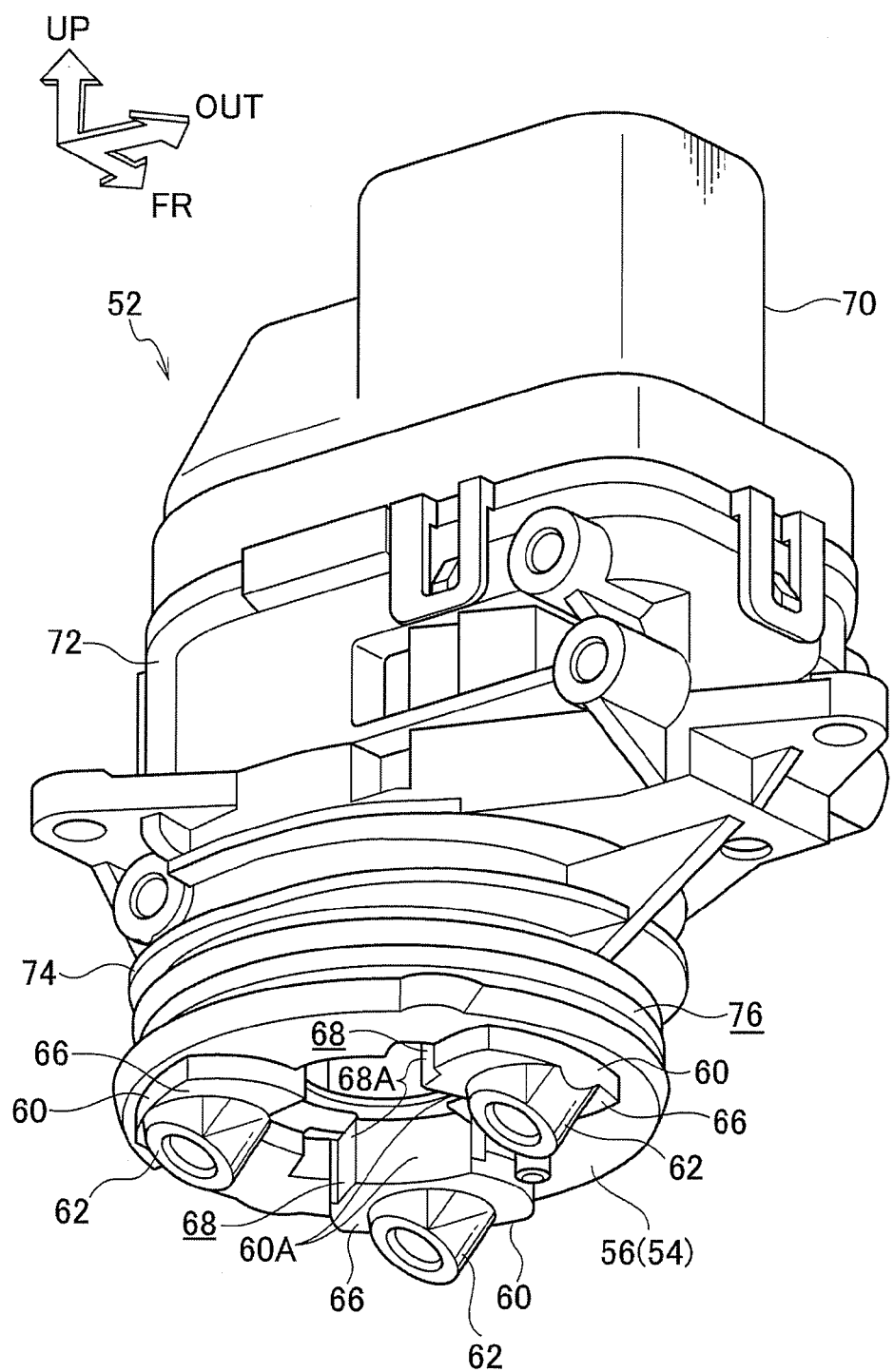
FIG. 9 is a perspective diagram, viewed from the vehicle forward side, illustrating the housing device of the door mirror device for a vehicle relating to the exemplary embodiment of the present invention.

As illustrated in FIG. 5, FIG. 8 and FIG. 9, the housing device 52 is provided with a stand 54 made of metal that serves as a support member. A circular plate-form mounting plate 56 that serves as a mounting portion is provided at a lower end portion of the stand 54, and a circular tube-form support shaft 58 that serves as a support shaft is provided at an upper side of the mounting plate 56. Thus, the mounting plate 56 and the support shaft 58 are disposed coaxially with the outer periphery abutting face 26A (the abutting tube 26) of the base 12, and the stand 54 is disposed coaxially with the outer periphery abutting face 26A.

A plural number (three in the present exemplary embodiment) of substantially rectangular solid-form abutting pillars 60 are formed at a lower portion of the mounting plate 56. The plural abutting pillars 60 are disposed at equal intervals in the circumferential direction of the stand 54.

A circular tube-form insertion tube 62 is formed integrally at each abutting pillar 60. Axial directions of the plural insertion tubes 62 are disposed to be parallel with one another and are disposed to be parallel with the axial directions of the mounting tubes 16 of the base 12. The insertion tubes 62 are inserted into the mounting tubes 16 and are mounted to the mounting tubes 16 by being fastened with mounting screws 64 that serve as a fastening member. The mounting screws 64 are inserted from the lower side into the mounting ring plates 18 of the mounting tubes 16 and threaded into the insertion tubes 62. Thus, the stand 54 is mounted to the base 12, and the housing device 52 is mounted to the base 12. In addition, the mounting plate 56 is inserted into the insertion recess portion 42 of the base cover 32, and a lower face of the mounting plate 56 abuts against (makes surface contact with) a floor face of the insertion recess portion 42 in the up and down direction. The insertion tubes 62 do not make contact with the mounting tubes 16 and the mounting ring plates 18.

Lower faces of the plural abutting pillars 60 are disposed in the same plane, and are formed to be flat plane-form upper abutting faces 66 that serve as a fourth abutting surface. The upper abutting faces 66 are disposed orthogonally to the up and down direction. The upper abutting faces 66 abut against (make contact with) the lower abutting faces 24 of the mounting tubes 16 in the up and down direction (the axial direction of the stand 54), while portions of the mounting plate 56 other than the upper abutting faces 66 do not abut against the base 12 in the up and down direction. Thus, the stand 54 is positioned in the up and down direction with respect to the base 12.

Faces at the stand 54 central axis sides of a predetermined number (two in the present exemplary embodiment) of the abutting pillars 60 are curved to have the form of faces along the same circumference, and are made to be inner periphery abutting faces 60A that constitute a second abutting surface. The inner periphery abutting faces 60A are disposed to be coaxial with the stand 54 and are disposed to be parallel with the up and down direction.

In the same predetermined number of the abutting pillars 60 at the faces of the outer side in the circumferential direction of the stand 54 outer side faces, abutting grooves 68 with rectangular shapes in cross-section are formed. The interior of each abutting groove 68 is opened to the lower side and to the stand 54 central axis side. Faces of the abutting grooves 68 that are continuous with the inner periphery abutting faces 60A are formed to be flat plane-form vertical abutting faces 68A, which constitute the second abutting surface, and are disposed in the same plane, parallel with the up and down direction (orthogonal to the circumferential direction of the stand 54).

Figure 4A:
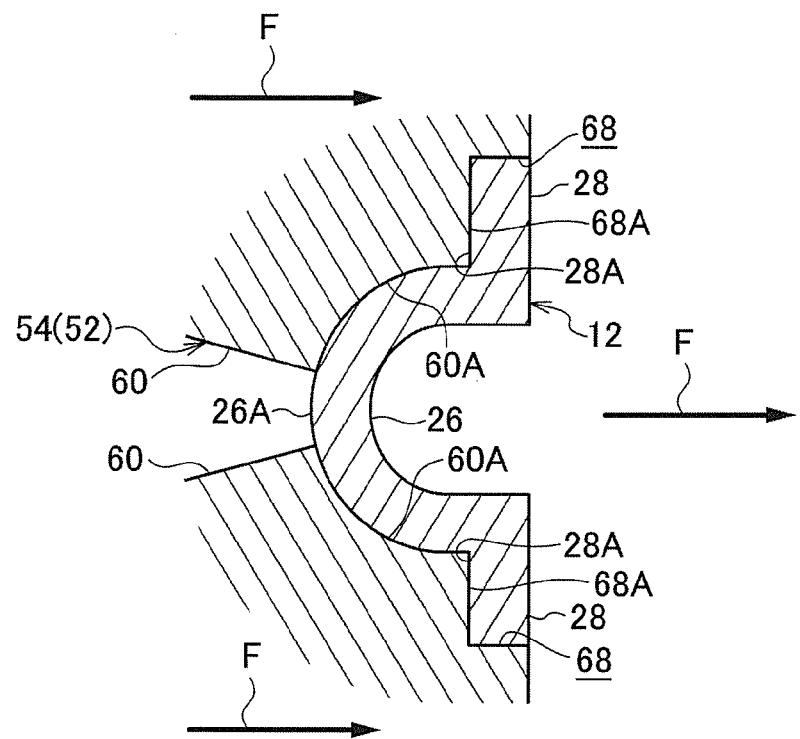
FIG. 4A is a diagram illustrating principal portions of the base and stand of the door mirror device for a vehicle relating to the exemplary embodiment of the present invention, which is a sectional diagram, viewed from upward, illustrating a positioned state of the base and the stand.
Figure 4B:
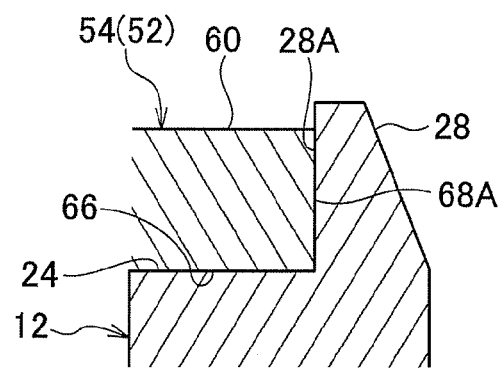
FIG. 4B is a diagram illustrating the principal portions of the base and stand of the door mirror device, which is a sectional diagram, viewed from sideward, illustrating the positioned state of the base and the stand.
Figure 4B:
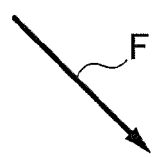

As illustrated in FIG. 4A and FIG. 4B, the inner periphery abutting faces 60A are abutted against (make surface contact with) the outer periphery abutting face 26A of the abutting tube 26 of the base 12 in horizontal directions (directions orthogonal to the axis of the stand 54), and the vertical abutting faces 68A are abutted against (make contact with) the perpendicular abutting faces 28A of the abutting protrusions 28 of the base 12 in a horizontal direction respectively. Portions of the mounting plate 56 other than the inner periphery abutting faces 60A and each of the vertical abutting faces 68A are not abutted against the base 12 in horizontal directions. Thus, the stand 54 is positioned in all horizontal directions with respect to the base 12.

As illustrated in FIG. 1 and FIG. 2, the support shaft 58 of the stand 54 is inserted into a drive body 70 that constitutes a turning body, and the drive body 70 is supported at the stand 54. When the housing device 52 is driven, the drive body 70 is turned about the support shaft 58 with respect to the stand 54.

A case 72 made of resin is provided at an outer periphery of the drive body 70. A substantially circular tube-form fitting tube 74 is formed at a lower end portion of the case 72. The fitting tube 74 is disposed to be coaxial with the stand 54. A rectangular fitting groove 76 is formed over the whole of an outer periphery of the fitting tube 74. The fitting groove 76 opens to the radial direction outer side of the fitting tube 74.

A main body portion 78, which constitutes the turning body, is supported at the drive body 70 of the housing device 52.

A substantially plate-form frame 80 is provided at the main body portion 78. A vehicle width direction inner side portion of the frame 80 is fixed to the drive body 70. Thus, the frame 80 is supported at the drive body 70, and the main body portion 78 is supported at the drive body 70. The main body portion 78 protrudes to the vehicle width direction outer side from the base 12, and is caused to stand out (extended). The main body portion 78 is made to be turnable integrally with the drive body 70 when the housing device 52 is driven. The main body portion 78 (including a side mirror 92 which is described below) is stowed by the main body portion 78 being turned toward the vehicle rear side and the vehicle width direction inner side integrally with the drive body 70.

The drive body 70 and frame 80 of the housing device 52 are accommodated in a visor 82 that serves as an exterior member (and is a design member). A visor cover 82A substantially in a curved plate form is provided at the vehicle forward side of the visor 82, and a visor rim 82B substantially in a rectangular tube shape is provided at the vehicle rearward side of the visor 82. The visor 82 is structured by the visor cover 82A and the visor rim 82B being assembled together. The visor cover 82A and the visor rim 82B are mounted to the frame 80, and thus the visor 82 is supported at the frame 80.

A fitting plate 84 is formed at a lower end of the visor 82 (the visor cover 82A and the visor rim 82B). A circular penetrating hole 86 is formed to penetrate through the fitting plate 84. The penetrating hole 86 is disposed to be coaxial with the stand 54 of the housing device 52. The fitting tube 74 of the case 72 of the housing device 52 is inserted through the penetrating hole 86. The fitting plate 84 is inserted into the fitting groove 76 of the fitting tube 74 and fitted thereto in the up and down direction. Thus, the fitting plate 84 is positioned in the up and down direction with respect to the fitting tube 74.

Figure 3:
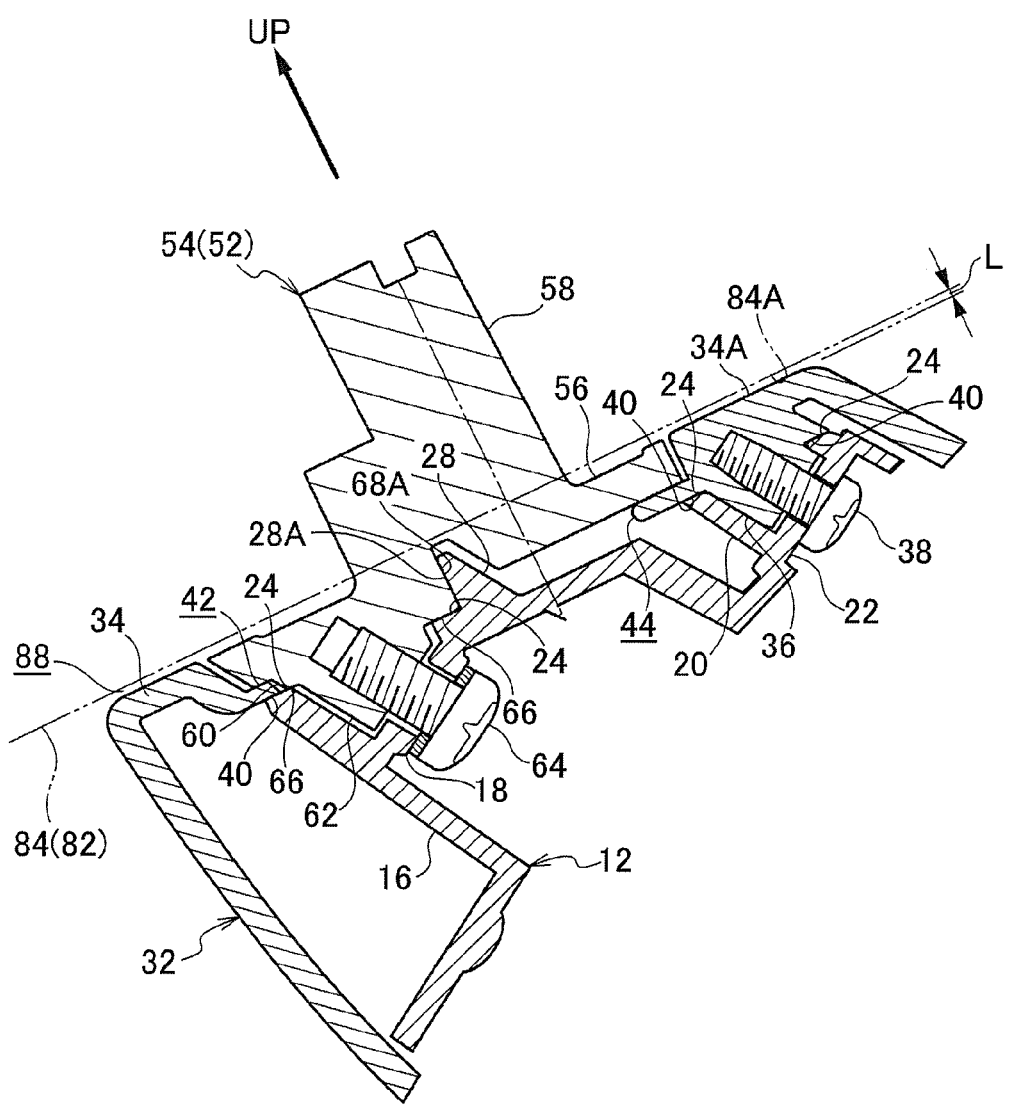
FIG. 3 is a sectional diagram, viewed from sideward, illustrating a base, a base cover and a stand of the door mirror device for a vehicle relating to the exemplary embodiment of the present invention.

A lower end face of the fitting plate 84 is formed to be a flat plane-form upper parting face 84A, and is disposed to be orthogonal to the up and down direction. The upper parting face 84A opposes the lower parting face 34A of the base cover 32 in the up and down direction. A parting gap 88 that serves as a gap is formed between the upper parting face 84A and the lower parting face 34A. The whole of the parting gap 88 is formed with an up and down direction dimension L (see FIG. 1 and FIG. 3).

A mirror surface adjustment device 90 (a drive unit), which serves as a mirror surface adjustment unit, is fixed to the vehicle outer side of the frame 80. The mirror surface adjustment device 90 is inserted into the visor rim 82B of the visor 82.

A substantially rectangular plate-form mirror 92 is assembled to the vehicle rearward side of the mirror surface adjustment device 90. In a state in which the mirror surface is oriented to the vehicle rearward side, the mirror 92 is accommodated in the visor rim 82B of the visor 82. When the mirror surface adjustment device 90 is driven, the mirror 92 is inclined by the mirror surface adjustment device 90, and a mirror surface angle of the mirror 92 is adjusted.

Next, operation of the present exemplary embodiment is described.

In the vehicle door mirror device 10 with the constitution described above, the base 12 is mounted to the door of the vehicle by fastening with the stud bolts 14, the base cover 32 is mounted to the base 12 by fastening with the assembly screws 38, and the gasket 46 and temporary fixing pawl 48 are mounted to the base 12 by fastening with the fastening screw 50.

The stand 54 of the housing device 52 is mounted to the base 12 by fastening with the mounting screws 64. Of the stand 54, the housing device 52 supports the main body portion 78 (including the visor 82 and the mirror 92) via the drive body 70.

The lower side face of the base 12 is oriented in a direction facing to the lower side toward the vehicle width direction inner side, and the interior of the base cover 32 opens in a direction facing to the lower side toward the vehicle width direction inner side. Thus, the lower side face of the base 12 and the lower side face (the opening face) of the base cover 32 are angled (inclined) with respect to the axial direction of the stand 54 (the up and down direction).

The axial direction of the mounting screws 64 is angled (inclined) in a direction facing to the lower side toward the vehicle width direction inner side, and is angled (inclined) with respect to the axial direction of the stand 54.

Therefore, when the stand 54 is to be mounted to the base 12 by fastening with the mounting screws 64, an operation of fastening with each mounting screw 64 (an operation of turning the mounting screw 64 about its axis with a fastening tool (a screwdriver) that is coaxially joined with the mounting screw 64) can be carried out in a state in which the axial directions of the mounting screws 64 are disposed in a direction substantially orthogonal to the lower side face of the base 12 and the lower side face of the base cover 32.

Thus, differently from a case in which the axial directions of the mounting screws 64 are made parallel with the axial direction of the stand 54, incidences of the operation of fastening with the mounting screws 64 being restricted by a vehicle width direction outer side portion of the peripheral wall of the base cover 32 or a vehicle width direction outer side portion of the base 12 or the like may be suppressed. Therefore, a need to structure the base cover 32 with plural separate components and assemble these plural separate components after assembly of the stand 54 to the base 12 may be eliminated, and a need to form cutouts in vehicle width direction outer side portions of the base 12 for placing of the mounting screws 64 and the fastening tool may be eliminated. Hence, structures of the base cover 32 and the base 12 may be simplified and stiffnesses of the base cover 32 and the base 12 may be improved.

The inner periphery abutting faces 60A of the stand 54 (the abutting pillars 60 of the predetermined number) are abutted against the outer periphery abutting face 26A of the base 12 (the abutting tube 26) in directions orthogonal to the axis of the stand 54 (horizontal directions). In addition, the vertical abutting faces 68A of the stand 54 (the abutting pillars 60 of the predetermined number) are abutted against the perpendicular abutting faces 28A of the base 12 (the pair of abutting protrusions 28) in a direction orthogonal to the axis of the stand 54. Thus, the stand 54 is positioned with respect to the base 12 wholly in directions (plural different directions) orthogonal to the axis of the stand 54, and the housing device 52 and the main body portion 78 are positioned with respect to the base 12 wholly in directions orthogonal to the axis of the stand 54.

Furthermore, the upper abutting faces 66 of the stand 54 (the plural abutting pillars 60) are abutted against the lower abutting faces 24 of the base 12 (the plural mounting tubes 16) in the axial direction of the stand 54 (the up and down direction). Thus, the stand 54 is positioned with respect to the base 12 in the axial direction of the stand 54, and the housing device 52 and the main body portion 78 are positioned with respect to the base 12 in the axial direction of the stand 54.

Therefore, even though the axial directions of the mounting screws 64 are angled (inclined) with respect to the axial direction of the stand 54, positioning accuracy of the housing device 52 and the main body portion 78 with respect to the base 12 wholly in directions orthogonal to the axis of the stand 54 and in the axial direction of the stand 54 can be improved.

The stand 54 is caused to approach the base 12 in a direction oriented to the lower side toward the vehicle width direction inner side with respect to the base 12 by a fastening force F (see FIG. 4A and FIG. 4B) to the base 12 from the mounting screws 64 of the stand 54, and the inner periphery abutting faces 60A, the vertical abutting faces 68A and the upper abutting faces 66 of the stand 54 are caused to abut against the outer periphery abutting face 26A, the perpendicular abutting faces 28A and the lower abutting faces 24 of the base 12, respectively.

Therefore, the inner periphery abutting faces 60A, the vertical abutting faces 68A and the upper abutting faces 66 of the stand 54 can reliably abut against the outer periphery abutting face 26A, the perpendicular abutting faces 28A and the lower abutting faces 24 of the base 12, respectively, and the stand 54 can be reliably positioned in all directions orthogonal to the axis of the stand 54 and in the axial direction of the stand 54. Thus, positioning accuracy of the housing device 52 and the main body portion 78 with respect to the base 12 in all directions orthogonal to the axis of the stand 54 and in the axial direction of the stand 54 can be reliably improved.

The inner abutting faces 40 of the base cover 32 (the plural fastening tubes 36) are abutted against the lower abutting faces 24 of the base 12 (the plural assembly tubes 20) in the axial direction of the stand 54 (the up and down direction). Thus, the base cover 32 is positioned with respect to the base 12 in the axial direction of the stand 54.

Therefore, a portion of the base 12 that positions the housing device 52 and the main body portion 78 (the stand 54) with respect to the base 12 in the axial direction of the stand 54 and a portion of the base 12 that positions the base cover 32 with respect to the base 12 in the axial direction of the stand 54 are both the lower abutting faces 24 that are in the same plane of the base 12. Thus, accuracy of the up and down direction dimension L of the parting gap 88 between the upper parting face 84A of the visor 82 of the main body portion 78 and the lower parting face 34A of the base cover 32 can be improved.

The axial directions of the fastening tubes 36 of the base cover 32, into which the assembly screws 38 that fasten the base cover 32 to the base 12 are threaded, the axial direction of the temporary fixing tube 30 of the base 12, into which the fastening screw 50 that fastens the gasket 46 and the temporary fixing pawl 48 to the base 12 is threaded, and the axial directions of the insertion tubes 62 of the stand 54, into which the mounting screws 64 that fasten the stand 54 (the housing device 52 and the main body portion 78) to the base 12 are threaded, are made to be parallel, and the axial directions of the assembly screws 38, the axial direction of the fastening screw 50 and the axial directions of the mounting screws 64 are made to be parallel.

Therefore, the mounting direction of the base cover 32 to the base 12 (the axial directions of the assembly screws 38 during fastening with the assembly screws 38), the mounting direction of the gasket 46 and the temporary fixing pawl 48 to the base 12 (the axial direction of the fastening screw 50 during fastening with the fastening screw 50) and the mounting directions of the housing device 52 and the main body portion 78 (the stand 54) to the base 12 (the axial directions of the mounting screws 64 during fastening with the mounting screws 64) are made to be parallel. Thus, the base cover 32, the gasket 46, the temporary fixing pawl 48, the housing device 52 and the main body portion 78 can be easily mounted to the base 12, and the vehicle door mirror device 10 may be easily assembled.

VARIANT EXAMPLE

Figure 10:
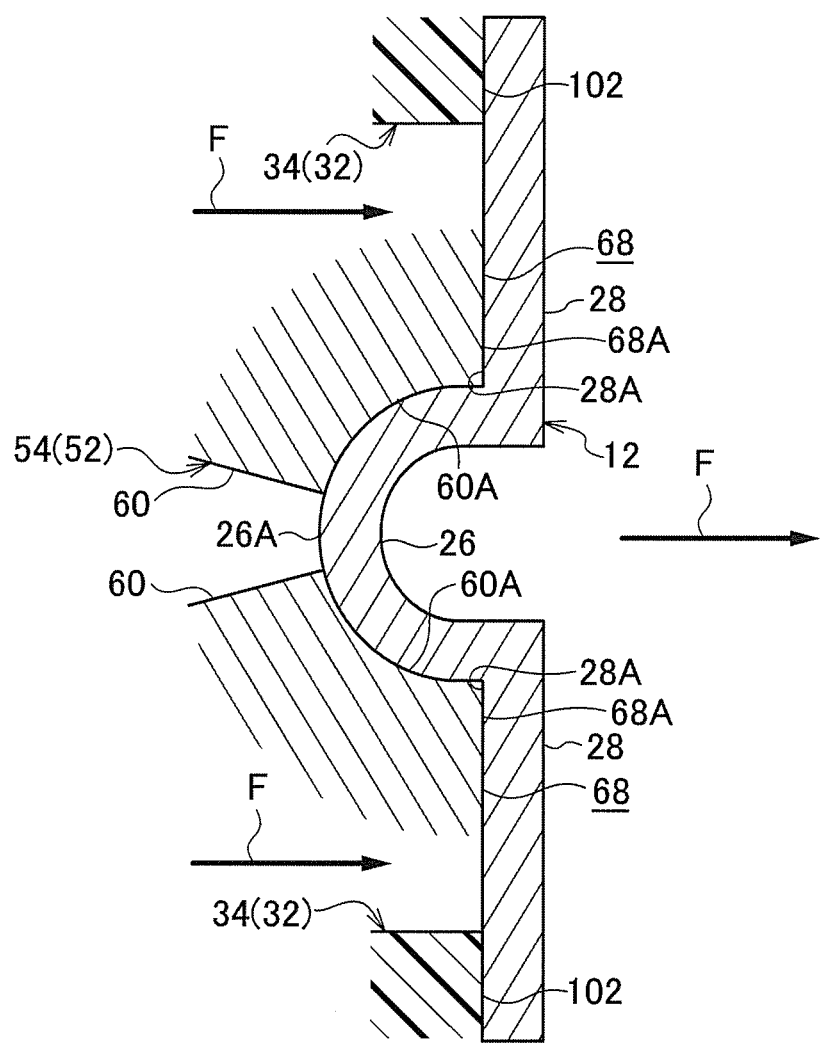
FIG. 10 is a sectional diagram, viewed from above, illustrating a positioned state of a base, base cover and stand of a door mirror device for a vehicle relating to a variant example of the exemplary embodiment of the present invention.

FIG. 10 illustrates principal portions of a vehicle door mirror device 100 relating to a variant example of the present exemplary embodiment in a sectional diagram viewed from above.

As illustrated in FIG. 10, in the vehicle door mirror device 100 relating to the present variant example, the abutting protrusions 28 of the base 12 (including the perpendicular abutting faces 28A) are extended (lengthened) to the sides thereof opposite to the sides at which the abutting tube 26 is disposed.

At the stand 54 of the housing device 52, the interiors of the abutting grooves 68 of the abutting pillars 60 are both opened to the lower side and the stand 54 central axis side, and further, opened to the sides thereof opposite to the stand 54 central axis sides thereof. Accordingly, the abutting protrusions 28 of the base 12 (including the perpendicular abutting faces 28A) are extended with respect to the abutting pillars 60, to the sides thereof opposite to the stand 54 central axis sides thereof.

Flat plane-form vertical abutting faces 102 that serve as the third abutting surface are formed at the top wall 34 of the base cover 32, at one side and the other side of the abutting tube 26 of the base 12. The vertical abutting faces 102 are disposed in the same plane, parallel to the up and down direction (orthogonal to the circumferential direction of the stand 54).

The vertical abutting faces 102 are abutted against (make surface contact with) the perpendicular abutting faces 28A of the abutting protrusions 28 of the base 12 in a horizontal direction (a direction perpendicular to the axis of the stand 54). Thus, the base cover 32 is positioned with respect to the base 12 in the horizontal direction.

Therefore, a portion of the base 12 that positions the housing device 52 and the main body portion 78 (the stand 54) with respect to the base 12 in the direction perpendicular to the axis of the stand 54 and a portion of the base 12 that positions the base cover 32 with respect to the base 12 in the direction perpendicular to the axis of the stand 54 are the perpendicular abutting faces 28A that are in the same plane of the base 12. Thus, positioning accuracy of the upper parting face 84A of the visor 82 of the main body portion 78 and the lower parting face 34A of the base cover 32 in the direction perpendicular to the axis of the stand 54 (facing accuracy of opposition in the axial direction of the stand 54) can be improved.

In the present exemplary embodiment (including the variant example), the axial directions of the stud bolts 14 that fasten the base 12 to the door of the vehicle may be made parallel with the axial directions of the assembly screws 38, the axial direction of the fastening screw 50 and the axial directions of the mounting screws 64. Accordingly, the base 12 may be easily mounted to the door of the vehicle, and the vehicle door mirror device 10 may be easily assembled to the door of the vehicle.

In the present exemplary embodiment (including the variant example), the turning body (the drive body 70 and the main body portion 78) is made turnable with respect to the stand 54 and is made housable. However, the support body (the drive body 70 and the main body portion 78) may be made non-turnable with respect to the stand 54 and may be made non-housable.

In the present exemplary embodiment (including the variant example), the mirror device for a vehicle of the present invention is applied at the vehicle door mirror device 10 or 100. However, the mirror device for a vehicle of the present invention may be applied at another outer vehicle mirror device at the exterior of a vehicle (for example, a vehicle fender mirror device), or at an inner vehicle mirror device at the interior of a vehicle.

What is claimed is:

1. A minor device for a vehicle, comprising:
    a mounting member that is provided at a vehicle body side;
    a support member that supports a turning body at which a minor is provided, the turning body being turned about a vertical axis of the support member such that the minor is turnable;
    a fastening member that fastens the mounting member and the support member, and mounts the support member to the mounting member, an axis of rotation of the fastening member being inclined to with respect to the axis of the support member;
    a first abutting surface that is provided at the mounting member and that is parallel to the axis of the support member;
    a second abutting surface that is provided at the support member, that is parallel to the axis of the support member and that, by abutting against the first abutting surface, positions the support member with respect to the mounting member in a direction perpendicular to the axial direction of the support member;
    a cover member that is mounted to the mounting member and covers the mounting member;
    a sealing member that is mounted to the mounting member and seals a portion between the vehicle body side and the mounting member; and
    a temporary fixing member that is mounted to the mounting member and temporarily fixes the mounting member at the vehicle body side,
    wherein at least one of a direction of mounting of the mounting member to the vehicle body side, a direction of mounting of the cover member to the mounting member, a direction of mounting of the sealing member to the mounting member or a direction of mounting of the temporary fixing member to the mounting member, is parallel with a direction of mounting of the support member to the mounting member.

2. The minor device for a vehicle of claim 1, further comprising a third abutting surface that is provided at the cover member and that, by abutting against the first abutting surface, positions the cover member with respect to the mounting member in a direction perpendicular to the axial direction of the support member.

3. A mirror device for a vehicle, comprising:
   a mounting member that is provided at a vehicle body side;
   a support member that is mounted to the mounting member and supports a turning body at which a minor is provided, the turning body being turned about a vertical axis of the support member such that the mirror is turnable;
   a cover member that is mounted to the mounting member and covers the mounting member;
   a support member abutting surface that is provided at the support member and that is perpendicular to the axis of the support member;
   a cover member abutting surface provided at the cover member and that is perpendicular to the axis of the support member; and
   a mounting member abutting surface that is provided at the mounting member, that is perpendicular to the axis of the support member and that, by abutting against the support member abutting surface and the cover member abutting surface, respectively positions the support member and the cover member with respect to the mounting member in an axial direction of the axis of the support member.

4. A mirror device for a vehicle, comprising:
   a mounting member that is provided at a vehicle body side;
   a support member that supports a turning body at which a minor is provided, the turning body being turned about a vertical axis of the support member such that the minor is turnable;
   a first abutting surface that is provided at the mounting member and that is parallel to the axis of the support member;
   a second abutting surface that is provided at the support member, that is parallel to the axis of the support member and that, by abutting against the first abutting surface, positions the support member with respect to the mounting member in a direction perpendicular to an axial direction of the axis of the support member;
   a cover member that is mounted to the mounting member and covers the mounting member;
   a fourth abutting surface that is provided at the support member and that is perpendicular to the axis of the support member;
   a fifth abutting surface provided at the cover member and that is perpendicular to the axis of the support member; and
   a sixth abutting surface that is provided at the mounting member, that is perpendicular to the axis of the support member and that, by abutting against the fourth abutting surface and the fifth abutting surface, respectively positions the support member and the cover member with respect to the mounting member in the axial direction of the support member.

5. The mirror device for a vehicle of claim 4, further comprising a fastening member that fastens the mounting member and the support member, and mounts the support member to the mounting member, an axial direction of the fastening member being inclined to the axial direction of the support member.

6. The mirror device for a vehicle of claim 4, further comprising:
   a sealing member that is mounted to the mounting member and seals a portion between the vehicle body side and the mounting member; and
   a temporary fixing member that is mounted to the mounting member and temporarily fixes the mounting member at the vehicle body side,
   wherein at least one of a direction of mounting of the mounting member to the vehicle body side, a direction of mounting of the cover member to the mounting member, a direction of mounting of the sealing member to the mounting member or a direction of mounting of the temporary fixing member to the mounting member, is parallel with a direction of mounting of the support member to the mounting member.

7. The mirror device for a vehicle of claim 1, wherein:
   the first abutting surface includes a curved surface and a planar surface;
   the second abutting surface includes a curved surface and a planar surface; and
   the curved surface of the first abutting surface abuts against the curved surface of the second abutting surface, and the planar surface of the first abutting surface abuts against the planar surface of the second abutting surface such that the first abutting surface and the second abutting surface are abutted in plural different directions perpendicular to the axial direction of the support member.

8. The minor device for a vehicle of claim 4, wherein:
   the first abutting surface includes a curved surface and a planar surface;
   the second abutting surface includes a curved surface and a planar surface; and
   the curved surface of the first abutting surface abuts against the curved surface of the second abutting surface, and the planar surface of the first abutting surface abuts against the planar surface of the second abutting surface such that the first abutting surface and the second abutting surface are abutted in plural different directions perpendicular to the axial direction of the support member.

9. The minor device for a vehicle of claim 3, wherein an upper face of a first member provided at the mounting member and an upper face of a second member provided at the mounting member are disposed in the same plane to form the sixth abutting surface.

10. The mirror device for a vehicle of claim 4, wherein an upper face of a first member provided at the mounting member and an upper face of a second member provided at the mounting member are disposed in the same plane to form the sixth abutting surface.

* * * * *